United States Patent
Mocotte et al.

[11] 3,846,465
[45] Nov. 5, 1974

[54] ALKENOXY SUBSTITUTED UREAS
[75] Inventors: Jacques Mocotte, Didier au Mont D'Or; Andre Disdier, Lyon; Francoise Prost, Villeurbanne, all of France
[73] Assignee: PROGIL, Paris, France
[22] Filed: Mar. 11, 1971
[21] Appl. No.: 123,440

Related U.S. Application Data
[63] Continuation-in-part of Ser. No. 742,186, July 3, 1968, abandoned.

[30] Foreign Application Priority Data
July 11, 1967 France .............................. 67.48902
May 30, 1968 France .............................. 68.50053

[52] U.S. Cl. ............. 260/453 R, 260/500.5, 71/120
[51] Int. Cl. .......................................... C07c 127/18
[58] Field of Search ................................ 260/453 R

[56] References Cited
UNITED STATES PATENTS
| | | | |
|---|---|---|---|
| 2,723,192 | 11/1955 | Todd | 71/120 |
| 3,079,244 | 2/1963 | Scherer et al. | 260/453 |
| 3,277,141 | 10/1966 | Steinbrunn et al. | 260/453 |
| 3,306,726 | 2/1967 | Berliner et al. | 260/453 |
| 3,352,899 | 11/1967 | Taniguchi | 260/453 |

FOREIGN PATENTS OR APPLICATIONS
1,540,424  9/1968  France

*Primary Examiner*—Leon Zitver
*Assistant Examiner*—Michael W. Glynn
*Attorney, Agent, or Firm*—Browdy and Neimark

[57] ABSTRACT

New urea derivatives of the general formula

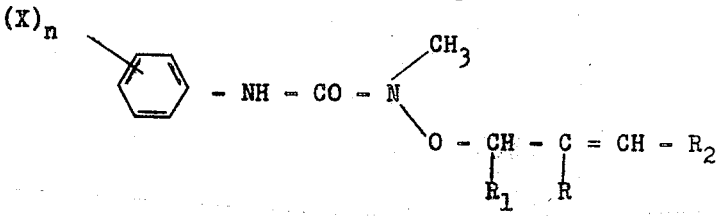

in which X may be chlorine, $n$ is an integer from 1 – 3 and R, $R_1$, and $R_2$ identical or different may be hydrogen or a methyl radical, having selective herbicidal and bacteriostatic or bactericidal activity.

2 Claims, No Drawings

ALKENOXY SUBSTITUTED UREAS

This is a continuation-in-part application of Ser. No. 742,186 filed July 3, 1968, now abandoned in favor of the present case.

The present invention relates to new trisubstituted ureas, and more particularly to herbicidal compositions containing those compounds as active substances.

It is known to use tri- and tetra-substituted ureas as total and/or selective herbicides. For these uses, it has been known for several years to use derivatives of urea having on one nitrogen atom, a possibly substituted phenyl radical, and on the other nitrogen atom, one or two alkyl or alkenyl radicals.

More recently, ureas of the same type have been proposed in which one of the aliphatic radicals is replaced by an alkoxy group, such as the N-3,4-dichloro-phenyl-N'-methyl-N'-methoxy-urea.

Of course, those products are on the whole good herbicides. However, the ones used for selective weed control are not always quite satisfactory because of their comparative toxicity with regard to cultivated plants.

There has now been discovered a new set of trisubstituted ureas the selectivity of which, in herbicidal action, is especially notable.

The substituted ureas according to the present invention, which are themselves novel products, adhere to the general formula hereinafter:

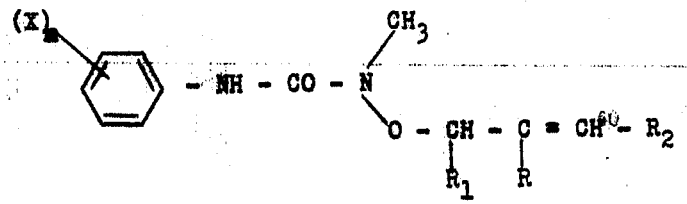

in which:
X may be chlorine
n is an integer from 1 to 3
R, $R_1$ and $R_2$ identical or different may be hydrogen or a methyl radical.

Among the compounds meeting this definition, may be mentioned: N-4-chloro-phenyl-N'-methyl-N'-allyloxy-urea; N-2,4-dichloro-phenyl-N'-methyl-N'-allyloxy-urea; N-3,4-dichloro-phenyl-N'-methyl-N'-allyloxy-urea; N-4-chloro-phenyl-N'-methyl-N'-methallyloxy-urea; N-3,4-dichloro-phenyl-N'-methyl-N'-methallyloxy-urea; N-2,4,5-trichloro-phenyl-N'-methyl-N'-methallyloxy-urea; N-4-chloro-phenyl-N'-methyl-N'-crotyloxy-urea; N-3,4-dichloro-phenyl-N'-methyl-N'-crotyloxy-urea; N-2,4,5-trichloro-phenyl-N'-methyl-N'-crotyloxy-urea; N-4-chloro-phenyl-N'-methyl-N'-(1-methyl-2-propeneoxy)-urea; N-3,4-dichloro-phenyl-N'-methyl-N'-(1-methyl-2-propeneoxy)urea.

The substituted ureas according to the present invention may be prepared by the application of known techniques, for example by reaction of an alkenyl halide with a N-hydroxy urea suitably substituted. The reaction which is generally conducted from 20° to 100°C, in an inert organic solvent such as an aliphatic alcohol, as methanol, and in the presence of sodium hydroxide, may be schematized by the following equation:

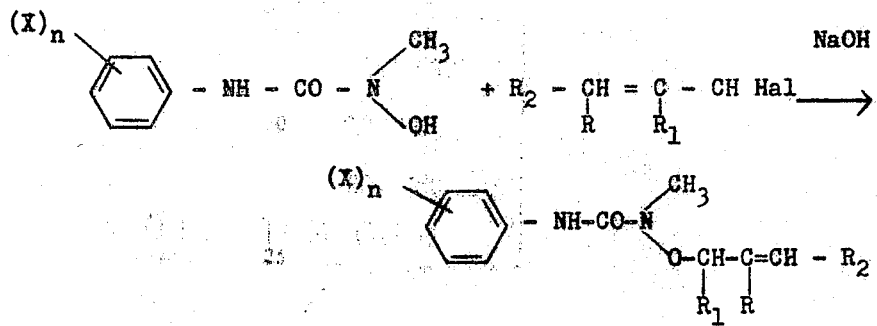

in which X, R, $R_1$, $R_2$ and n have the hereinabove meanings.

The new urea formed in this way is then separated from the reaction mixture and recrystallized in a suitable solvent such as an aliphatic hydrocarbon as hexane, or an aromatic one as benzene. The intermediate hydroxy-ureas used in this process are themselves obtained according to usual techniques, for example by reaction of the N-methyl-hydroxylamine on the suitable isocyanate.

The present invention is not limited to the compounds of formula 1 obtained according to the process described hereinabove, but is extended to all the ureas meeting this formula, whatever may be their method of preparation.

The new trisubstituted ureas according to the present invention generally are white crystalline solids soluble in the usual organic solvents. Some of them are oils having a more or less high viscosity.

As mentioned hereinabove, the new ureas according to the invention are excellent selective herbicides. They are able to prevent growth or to provoke the destruction of weeds without being prejudicial to germination or growth of the cultivated plants. Their harmless character with regard to useful plants is confirmed, even when they are used in high quantities as for example 8 to 10 kg/ha.

The specific action of the compounds according to the invention is exerted in an unexpected way as those ureas are capable of destroying or preventing the growth of weeds belonging to a family of plants, while respecting the cultivated plants of the same family. Tests have shown, for example, they prevent the growth of graminaceae such as foxtail (*Alopecurus agrestis*) and oat-grass (*Avena fatua*) in wheat and barley fields in rates from 90 to 100%, without prejudicing to the growth of those useful plants which are themselves graminaceae. Because of that, the ureas according to the invention are especially interesting as selective herbicides of cereals and especially wheat.

Moreover, those substances have a persistant activity, that is they prevent any growth of the undesirable plants for several months (6 to 8). Accordingly, the unfavorable concurrence of weeds is prevented during the entire time of the cultivated plants development and until their crop.

Among the products of the present invention, the ones seeming to show the more notable selectivity and herbicidal efficiency are the: N-4-chloro-phenyl-N'-methyl-N'-allyloxy-urea; N-4-chlorophenyl-N'-methyl-N'-methallyloxy-urea; N-3,4-dichlorophenyl-N'-methyl-N'-allyloxy-urea; N-3,4-dichloro-phenyl-N'-methyl-N'-(1-methyl-2-propene oxy)-urea and N-3,4-dichloro-phenyl-N'-methyl-N'cotyloxy-urea.

The ureas of the present invention are usable preferably in treatments of pre-emergency (after sowing and before plant sprouting) although post-emergency treatments (after plant sprouting) are also possible. They may be used according to the usual formulations, that is in the form of powders for powdering, wettable powders, granules, solutions, suspensions, emulsions, etc. Usual fillers, solvents, emulsifiers and additives well known by the man skilled in the art may be added. Moreover, they may be mixed with one another or with products having themselves a specific activity, such as various biocides, fertilizers, etc.

The quantities of active ingredient to be used may vary between large limits according to the period and type of application, the nature of the plants to be destroyed and their growth stage, the climate conditions, etc. Quantities of between 1 and 10 kg. per ha. fit generally in all the cases. As indicated before, due to the high specificity of the herbicidal effect of ureas according to the invention, the utilization of relatively high quantities, for example in the weed control in cereals, does not produce any damage hazard to the crops.

In addition, the compounds according to the present invention have an interesting action in the bacterial field. Thus, they kill or inhibit the development of bacteriae, when added at rates of, for example 20 to 200 parts per million, to a mixture in which bacteriae would normally develop.

The examples hereinafter given in a non limitative way, show the herbicidal and bactericidal efficiency of some ureas according to the invention.

Example 1

Pre-emergency tests have been made in greenhouse, in order to study the herbicidal efficiency of some ureas.

These ureas had been obtained from the suitable N-hydroxy-ureas and alkenyl halides.

The N-3,4,-dichloro-phenyl-N'-methyl-N'-allyloxy-urea has been prepared by reacting at 40°–45°C., 240 parts of N-3,4-dichloro-phenyl-N'-methyl-N'-hydroxy-urea with 100 parts of allyl chloride in methanol and in the presence of an aqueous solution of sodium hydroxide, then, after dilution with water and filtration, in recrystallizing the obtained precipitate (250 parts) in a mixture of benzene/hexane. The product, identified by elementary analysis as being the allyloxy-urea hereinabove, was a white crystalline solid, melting at 81°C.

Operating under similar conditions the following have been obtained:
N-4-chlorophenyl-N'-methyl-N'-allyloxy-urea (F = 76°C.)
N-3,4-dichloro-phenyl-N'-methyl-N'-crotyloxy-urea (F = 70°C.)
N-3,4-dichlorophenyl-N'-methyl-N'-(1-methyl 2-propene-oxy)-urea (F = 40°C.).

On culture vats filled with a mixture of garden earth and vegetable mould, sown some hours before with monocotyledons seeds (wheat, foxtail, a weed among the most difficult to be destroyed in cereals) and dicotyledons (turnip, mustard) aqueous suspensions of every one of the ureas indicated hereinabove, were sprayed in quantities corresponding to 3,000 l. per ha., the quantities of applied active ingredient being respectively equal to 2, 4, 8 and 10 kg/ha. The vats have been maintained in a greenhouse at day temperatures of 25°C. and night temperatures of 15°C., with a daily artificial lighting of 16 hours, and with normal watering.

Reports about efficiency and observations about germination and growth of the sprouts have been made daily for 32 days. The obtained results at the end of this time are included in the table hereinafter.

The efficiency of the products has been estimated according to the following scale;

0 - normal germination and growth
1 - light decrease of growth but survival of plants
2 - sharp decrease of growth and yellowing of plants
3 - strong decrease of growth going with morphological anomalies and/or photosynthesis alteration. General decaying.
4 - total destruction of plants after a beginning of development.
5 - non-existent or very weak germination followed with a quick death.

Table 1

| Plants | Wheat | | | | Foxtail | | | | Mustard | | | | Turnip | | | |
|---|---|---|---|---|---|---|---|---|---|---|---|---|---|---|---|---|
| Quantities (kg/ha) | 2 | 4 | 8 | 10 | 2 | 4 | 8 | 10 | 2 | 4 | 8 | 10 | 2 | 4 | 8 | 10 |
| N-4-chloro-phenyl-N'-methyl-N'-allyloxy-urea | 0 | 0 | 0 | 0 | 1 | 1 | 2 | 3 | 2 | 2 | 4 | 5 | 2 | 2 | 3 | 3 |
| N-3,4-dichloro-phenyl-N'-methyl N'-allyloxy-urea | 0 | 0 | 0 | 0 | 1 | 1 | 3 | 3 | 2 | 4 | 5 | 5 | 2 | 4 | 5 | 5 |
| N-3-4-dichloro-phenyl-N'-methyl-N'-crotyloxy-urea | 0 | 0 | 0 | 0 | 1 | 2 | 3 | 3 | 2 | 4 | 5 | 5 | 1 | 2 | 4 | 4 |
| N-3-4-dichloro-phenyl-N'-methyl N' (1-methyl-2-propene-oxy)-urea | 0 | 0 | 0 | 0 | 0 | 1 | 2 | 3 | 2 | 3 | 5 | 5 | 2 | 3 | 3 | 4 |

As it is possible to see, the ureas according to the present invention have a very surprising selective and herbicidal effect in monocotyledon field since they destroy foxtail while being harmless with regard to wheat. They are also effective in the dicotyledon field. Those properties make them very suitable for the control of weeds growing in crops, especially cereals.

Example 2

A set of tests has been made in the open fiels in treating earth lots with N-3,4-dichloro-phenyl-N'-methyl-N'-allyloxy-urea.

For this purpose aqueous suspensions of this urea in a finely divided state have been prepared.

On earth lots sown one week before with autumn wheat, the suspensions have been sprayed in quantities corresponding to 10,000 1/ha, the quantities of applied active matter being respectively 2.4 and 8 kg/ha.

Then until harvest time, comparative reports have been made of the plants present in the treated lots and in the blank lots. Thus the activity of the tested urea has been determined. In the blank lots the most important weeds which could be found were the following: feverfew (Matricaria sp), Chenopodium (Chenopodium sp.) Field mustard (Sinapis arvensis), Wallflower (Raphanus raphanistrum), knotgrass (Polygonum persicaria, P. aviculare and P. convovulus) Cornflower (Centaures Cyanus), corn poppies (Papaver sp.) veronica (Veronica hederea folia), chickweed (Stellaria media), Agrostis (Agrostis), Cockle, (Agrostemma githago), ray-grass (Lolium), field bindweed (Convolvulus arvensis)

Table 2 hereinafter which reproduces the observations made 5, 6 and 7 months after the treatment, gives the percentages of plants which have been destroyed or the growth of which has been prevented.

Table 2

| Observations time (= months after treatment) Quantities | 5 | | 6 | | 7 | |
|---|---|---|---|---|---|---|
| | Destruction percentage | | | | | |
| | wheat | Weeds | Wheat | Weeds | Wheat | Weeds |
| 2 kg/ha | 0 | 50 | 0 | 60 | 0 | 70 |
| 4 kg/ha | 0 | 70 | 0 | 70 | 0 | 85 |
| 8 kg/ha | 0 | 90 | 0 | 90 | 0 | 98 |

Those results show that the cereal has not been damaged by the herbicidal product according to the invention during its growth and until the harvest. On the contrary the weeds undergo a strong inhibition of development and even, for 8 kg/ha practically disappear from the treated lots.

Identical tests made with the N-4-chloro-phenyl-N'-methyl-N'-methallyloxy-urea have given fairly similar results.

Example 3

To emphasize the superiority of the selective effort of the products according to the invention, in comparison with herbicides of a known type, earth lots which have been sown with wheat a week before have been treated with the following compounds: N-3,4-dichloro-phenyl-N'-methyl-N'-methoxy-urea, and N-3,4-dichloro-phenyl-N'-methyl-urea.

A quantity of active matter corresponding to an application of 8 kg. per ha. of land was used.

The products have been applied and efficiency estimations made in the same conditions as in Example 2. The weeds in the blank lots were nearly the same as in said example.

In Table 3 hereinafter, are reproduced the results obtained with the compounds hereinabove, compared with efficiency numbers of the N-3,4-dichloro-phenyl-N'-methyl-N'-allyloxy-urea, for the same quantity of active matter.

TABLE 3

| Observation time (= months after treatment) | 5 | | 6 | | 7 | |
|---|---|---|---|---|---|---|
| Tested products | Destruction percentage | | | | | |
| | Wheat | Weeds | Wheat | Weeds | Wheat | Weeds |
| N-3,4-dichloro-phenyl-N'methyl-N'methoxy-urea | 60 | 90 | 60 | 100 | 65 | 100 |
| N-3,4-dichloro-phenyl-N'methyl-urea | 50 | 70 | 50 | 80 | 50 | 90 |
| N-3,4-dichloro-phenyl-N'methyl-N'-allyloxy-urea | 0 | 90 | 0 | 90 | 0 | 98 |

These results show that, for an effect of weed destruction at least as satisfactory as the previous ones, the new compounds according to the invention have the advantage of being much more inoffensive with regard to the useful plants, than the herbicides of a known type which have been tested.

Example 4

Tests were conducted to determine the bacteriostatic or bactericidal properties of the products according to the invention. The tests were conducted as follows:

The compounds to be studied were dissolved in a polyalcohol ether known under the name of "Polyglycol 400" (that is the condensation product of ethylene oxide on one mole water, having a mean molecular weight of 400); the solutions were added to a classical bacto-nutrient broth sown with the bacteria Staphylococcus aureus, in such a way that mixtures containing either 200 or 20 parts per million, of the compounds to be tested, were obtained.

Then these mixtures were maintained at 37°C. for 24 hours.

At that time, the bacteriae development was evaluated by comparison with a nutrient broth sown with the same bacteria but containing no urea derivative. This experiment permitted detection as to whether the studied compounds had a bacteriostatic effect, that is if they could inhibit the bacteriae normal development. If it was the case, a part of the hereinabove mixtures was introduced into a new nutrient broth containing no bacteria and left again at 37°C. for 24 hours. Under these conditions, the bacteriae remaining in this part of the firstly treated mixtures would develop if they were not killed in the first experiment and their growing was only inhibited. Thus this second test permitted determination as to whether the studied compounds had not only a bacteriostatic but also a bactericidal action. It is clear that when a compound had no bacteriostatic effect, it was not further studied.

The results, quoted from 0 = no action to 4 = no bacteriae development, are given in the following table.

| Compounds | Amt. of compounds in parts per million | Bacteriostatic action | Bactericidal action |
|---|---|---|---|
| N(3,4 dichlorophenyl)-N'methyl-N'allyloxy-urea | 200<br>20 | 4<br>4 | 4<br>0 |
| N(3,4 dichlorophenyl)-N'methyl-N'1-methyl-2-propene-oxy-urea | 200<br>20 | 4<br>4 | 4<br>4 |
| N(3,4-dichlorophenyl)-N'methyl-N'crotyloxy-urea | 200<br>20 | 4<br>3 | 4<br>0 |

It appears from the above results that the compounds of the present invention have bacteriostatic and bactericidal activity.

What is claimed is:

1. A urea derivative selected from the group consisting of N-3, 4-dichloro-phenyl-N'-methyl-N'-allyloxy-urea; N-3,4-dichloro-phenyl-N'-methyl-N'-methallyloxy-urea; N-3,4-dichloro-phenyl-N'-methyl-N'-(1-methyl-2-propene-oxy)-urea and N-3,4-dichloro-phenyl-N'-methyl-N'-crotyloxy-urea.

2. A urea derivative in accordance with claim 1 consisting of N-3,4-dichloro-phenyl-N'-methyl-N'-allyloxy-urea.

* * * * *